United States Patent [19]

Miller

[11] Patent Number: 4,762,176
[45] Date of Patent: Aug. 9, 1988

[54] AIR-WATER SEPARATOR

[76] Inventor: Orand C. Miller, P.O. Box 711, Garden City, Kans. 67846

[21] Appl. No.: 29,208

[22] Filed: Mar. 23, 1987

[51] Int. Cl.⁴ .............................................. E21B 43/38
[52] U.S. Cl. .................. 166/105.5; 137/403; 210/188; 417/40; 417/435
[58] Field of Search ............ 166/105.5, 106, 53, 166/54, 188, 107, 265, 105; 417/40, 435; 210/188, 533, 535; 55/36, 164; 137/403, 565

[56] References Cited

U.S. PATENT DOCUMENTS

| 47,011 | 3/1865 | Greenleaf | 166/105.5 |
| 2,158,393 | 5/1939 | Aulman | 166/105.5 |
| 2,674,192 | 4/1954 | Coberly | 137/403 |
| 3,025,798 | 3/1962 | Coberly et al. | 137/403 |
| 3,318,247 | 5/1967 | Yost | 137/403 |
| 3,485,300 | 12/1969 | Engle | 166/265 |
| 3,735,815 | 5/1973 | Myers | 166/105.5 |
| 4,330,306 | 5/1982 | Salant | 166/105.5 |
| 4,615,387 | 10/1986 | Johnson et al. | 166/105.5 |

Primary Examiner—Stephen J. Novosad
Assistant Examiner—Bruce M. Kisliuk
Attorney, Agent, or Firm—Edward L. Brown, Jr.

[57] ABSTRACT

An air-water separator used in a water well upstream of the intake on a submersible pump comprising a collar member positioned between the well casing and the water pipe including a plurality of spring-biased check valves in the collar which allow gravity flow through the collar only after a certain static head of water is built thereabove to allow sufficient time for the air bubbles to separate from the water before intake into the pump.

6 Claims, 2 Drawing Sheets

AIR-WATER SEPARATOR

BACKGROUND OF THE INVENTION

The separation of gas from fluids in all types of wells has been a problem for over a century as evidenced by U.S. Pat. No. 47,011. Submersible pumps both in water and oil wells have had operating problems with gas-containing liquids, as taught in U.S. Pat. No. 2,158,393 and 4,330,306. In oil wells, the typical solution has been to pass the gas laden liquid through a mesh screen which traps the gas bubbles while passing the fluid, as exemplified in the last-mentioned patent.

In water wells, there are frequently multiple water-bearing stratas at various depths in a well. The water enters the well casing through perforations in casing adjacent the gravel stratas and falls to the bottom of the well where a turbine pump is located to raise the water to the surface. The level of the sump or pumping level is quite often hundreds of feet below the producing level and the fall to the sump of the well causes the water to entrain a substantial amount of air which interferes with the operation of any turbine type of pump.

One solution to this problem has been to drill a substantially oversized hole from that of the casing, and then fill the hole surrounding the casing with sized gravel which sufficiently slows the downward movement of the water to the sump of the well to allow the air to rise and separate before the water is drawn into the intake pump. This solution is obviously quite expensive since it entails large well holes of diameters up to 24 inches.

Another solution to this problem is shown in previously mentioned U.S. Pat. No. 2,158,393 which also involves drilling an expensive over-sized hole. In this system, a supplemental casing is positioned outside the main casing surrounding the water-bearing strata with separate small diameter pipes connecting the supplemental casing to the sump of the well so that the water passing therethrough is in a solid column without air bubbles or pockets. To achieve a solid column of water passing from the producing strata to the sump, it is difficult to achieve with varying flow rates from the strata, as evidenced by the necessity of manually-operated ball valves 17 in the last-mentioned patent.

SUMMARY OF THE INVENTION

The system of the present invention can handle a wide range of flow rates without the necessity of setting a series of manually-operated valves, as described in the last-mentioned patent. The separator of the present invention includes a plurality of ball-type check valves which are spring-biased closed and function in the manner of a relief valve. The ball valves are normally spring-based closed and will block any water flow through the separator until a substantial static head in the order of 70 to 100 feet is built up on top of the separator at which time the ball checks will open and allow water to pass therethrough as long as a certain head pressure is maintained. The spring-biased balls function as variable orifices and will pass a varying flow rate from, for example, 5 GPM up to 2000 GPM while maintaining an essentially constant head pressure thereabove. If the flow rate out of the water-producing strata is 2000 GPM, the multiple ball valves will sufficiently open due to the compression of their respective springs to allow 2000 GPM to flow.

It is therefore the principal object of the present invention to provide an air-water separator of relatively simple design which allows utilization of a minimum hole diameter.

Another object of the present invention is to provide an air-water separator which can handle a very wide range of flow rates without any adjustment or modification of the separator.

A further object of the present invention is to provide an air-water separator which can be contained within a standard size water well casing.

These and other important objects and advantages of the present invention as specifically set forth in or will become apparent from the following detailed description of the preferred embodiments of the invention, when read in conjunction with the accompanying drawings.

DETAILED DESCRIPTION OF THE INVENTION

Figure 1:
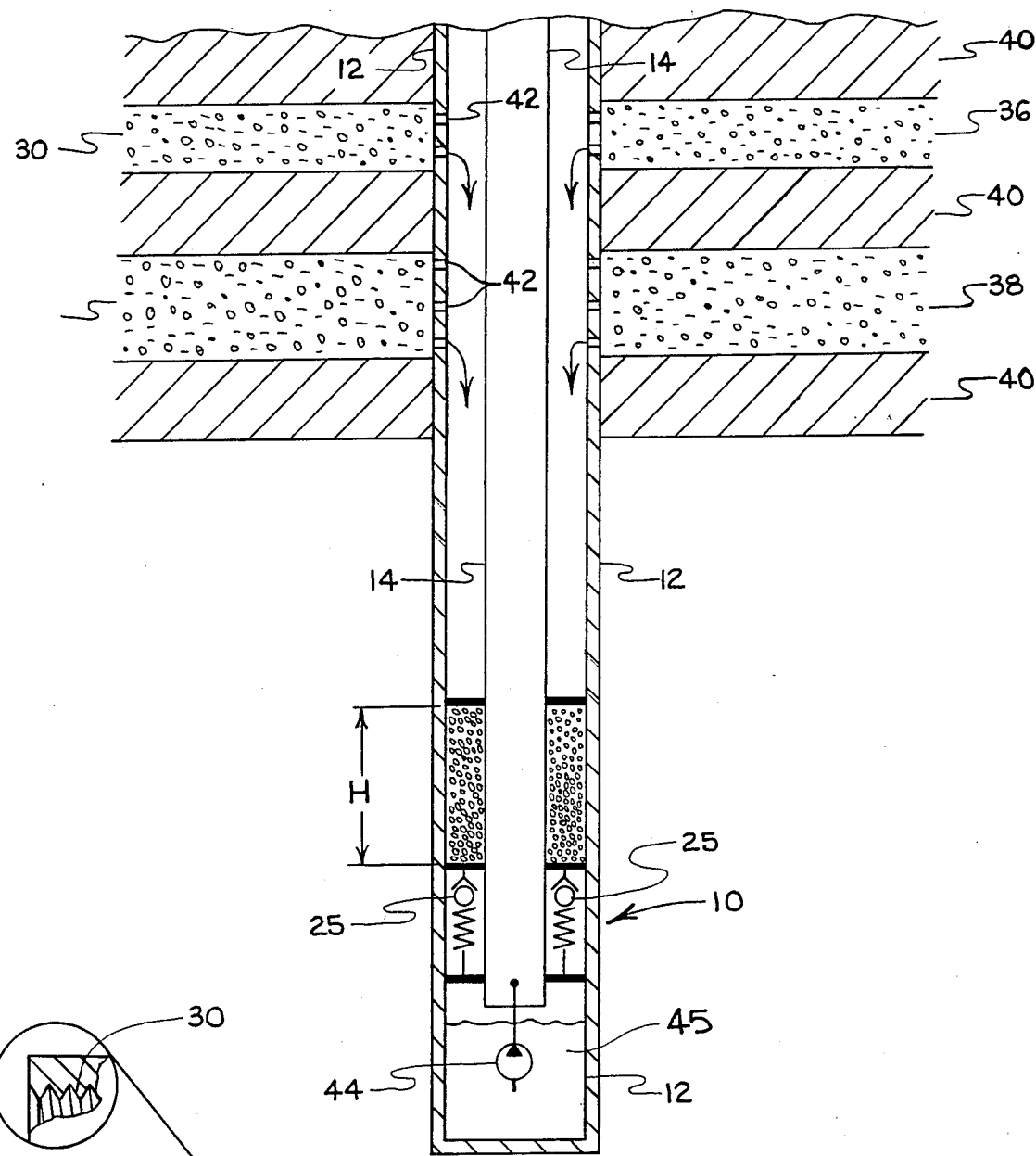
FIG. 1 is a schematic illustration of the separator constructed in accordance with the present invention positioned within a well.
Figure 3:
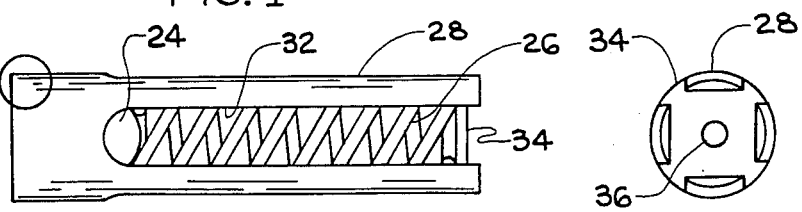
FIG. 3 is a similar view to FIG. 2 but not in section, showing the ball check and cage sleeve.
Figure 4:
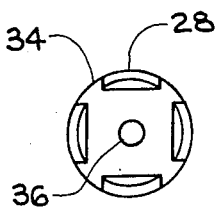
FIG. 4 is a right end view of the cage sleeve of FIG. 3.

Referring now to FIG. 1 of the drawings, the air-water separator is schematically illustrated by reference numeral 10 positioned between the well casing 12 and the water pipe 14 blocking passage of water from formation 36 and 38 to the submersible pump 44 located at the bottom of the well.

After the well is drilled and the casing 12 is set, perforations 42 are made in the casing adjacent the water-bearing stratas 36 and 38 which allows the water to enter the casing and fall to the bottom or sump 45 of the well. Located at the bottom of the well is a submersible turbine type pump 44 whose discharge is connected to water pipe 14 for lifting water from the well.

Figure 5:
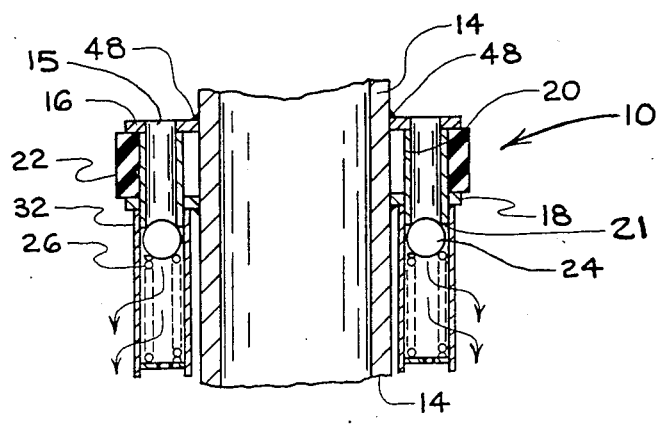
FIG. 5 is a sectional view taken along lines 5—5 of FIG. 6.

The air-water separator 10 is welded to water pipe 14, as best seen in FIG. 5. Pipe 14 is lowered into the well in threaded sections as is commonly known in well drilling and is not shown in the drawing.

Figure 6:
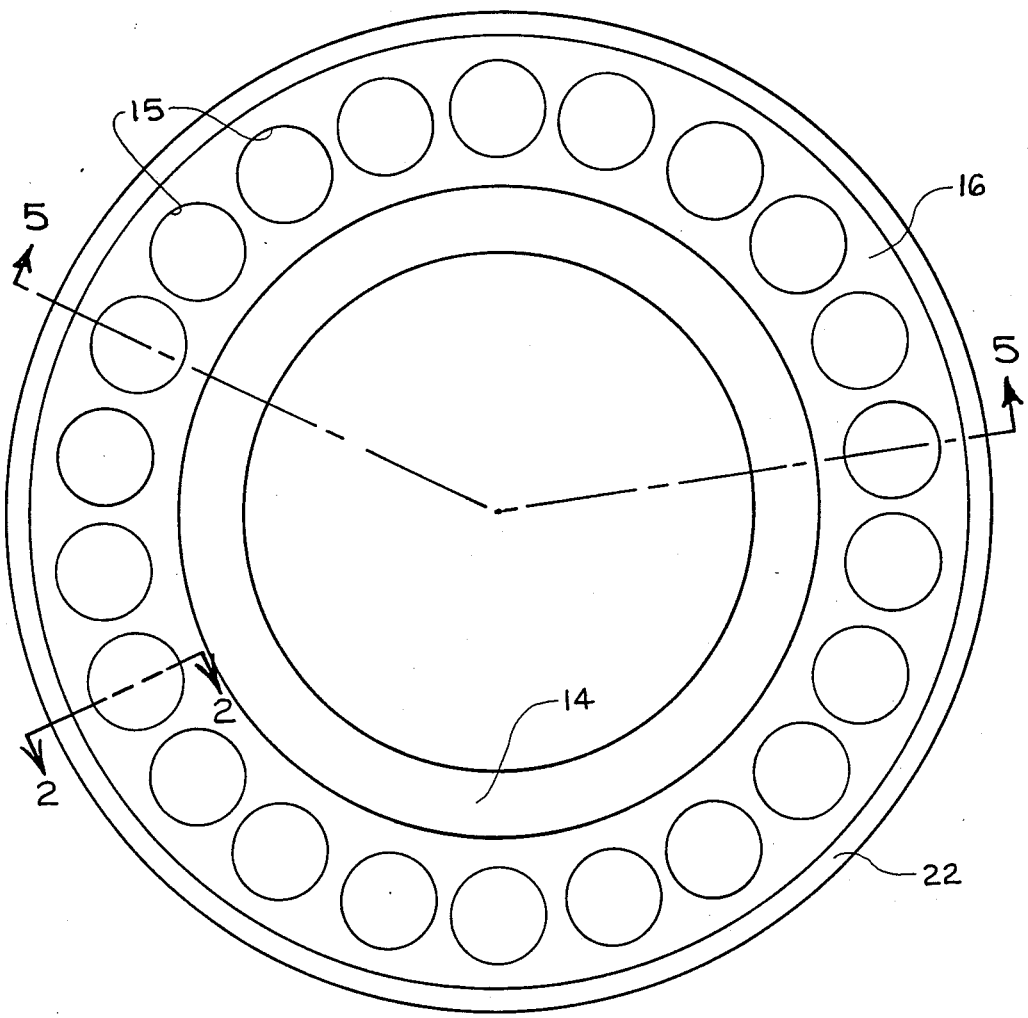
FIG. 6 is a top view of the air-water separator.

Separator 10, as seen in FIGS. 5 and 6, comprises a pair of collar plates 16 and 18 which are welded to a section of pipe 14. Located around the periphery of collar plate 16 are 22 equally spaced holes 15 which are aligned with a matching set of holes in collar plate 18. Positioned in each hole 15 is a tube section 20 which has a lower end 21 extending below collar plate 18. The collar plates and tube sections are all welded or braised together in sealing relation.

Figure 2:
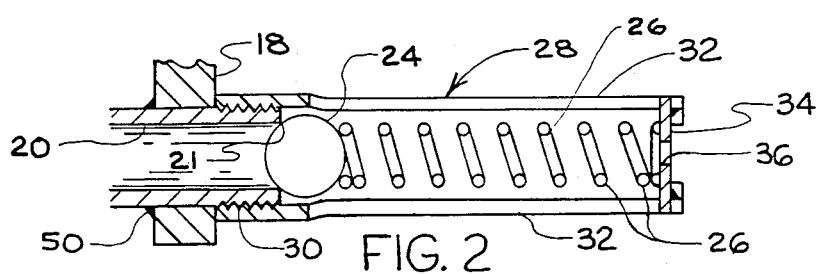
FIG. 2 is a longitudinal sectional view taken along line 2—2 of FIG. 6.

As seen in FIG. 2, the lower end 21 of tube section 20 is threaded on its outside diameter for engagement with a tubular cage sleeve 28 which retains the spring 26 and check ball 24 in sealing engagement with the lower end or seat 21 of tube section 20. Cage sleeve 28 includes a series of four longitudinal slots 32 which are quadrantally spaced around the periphery of sleeve 28. Located in the right end of cage 28, is a retainer plate 34 which maintains the proper biasing force on ball check 24 which in turn maintains a proper head height H above the separator 10. Retainer plate 34 can be held in place by welding or other mechanical means and incorporates an opening 36 for further relief passage along with longitudinal slots 32. Cage sleeve 28 is threaded on its inside diameter 30 for engagement with tube section 20.

Ball checks 24 are held against a seat 21 by the compressive spring force from spring member 26. All of the spring-biased check valves 25 are set with approximately the same spring force so that when a certain static head H is reached, they will all begin to open together.

Positioned around the periphery of separator 10 is a rubber gasket ring 22, as best seen in FIG. 5, which provides a rough seal with the inside diameter of casing 12.

OPERATION

In the absence of separator 10, the falling water entering the casing through perforations 42 becomes highly aerated by the time it reaches the sump area 45 at the bottom of the well and submersible pump 44 will not pump by reason of the accumulated air within the pump.

Separator 10 is attached to the bottom section of water pipe 14, which in turn carries the pump discharge water up from the bottom of the well from submersible pump 44. Separator 10 is positioned in the casing 12 just upstream of the pump sump area 45.

As the water from gravel formations 36 and 38 enters the casing through perforations 42, it falls in the casing until it reaches separator 10 and begins to fill. When the water reaches a predetermined height H which is normally in the vicinity of between 70 and 100 feet, the spring-biased check valves 25 will begin to open and allow the standing water to pass to sump area 45. The standing column of water H permits the bubbles in the air contained therein to rise and separate from the water. If the check valves 25 pass water at a more rapid rate than it is entering the casing, the head level H will begin to drop and the ball check valves 25 will begin to close until the height H is again reached. Each ball check valve 25 functions as a variable orifice with the flow rate across each seat 21 increasing as the head increases. As viewed in FIG. 2, once ball 24 moves one-half inch off its seat, the four longitudinal slots 32 are fully open and the check valve will flow at a very high rate. The separator 10 which has an outside diameter of approximately 15 inches is capable of flowing over 2000 gallons per minute across all of the check valves 25 at one time.

When gasket ring 22 is positioned in place, as seen in FIGS. 5 and 6, it has an outside diameter slightly less than the inside diameter of casing 12 so that the separator 10 freely slides through the casing with a relatively loose fit allowing minor leakage thereacross.

Having described the invention with sufficient clarity that those skilled in the art may make it and use it, what is claimed as new and desired to be secured by Letters Patent is:

1. A water well separator assembly for separating air from an air entrained flowable liquid in a well casing which assembly is adapted to be associated with a submersible pump with a pump inlet downstream of the separator for pumping the liquid through a discharge pipe concentrically positioned inside the casing, the assembly comprising:

a collar member means attachable to and surrounding the discharge pipe to prevent fluid flow in the casing;

a plurality of spring-biased check valve means positioned in the collar each means including a poppet member and spring, the poppet members are normally spring-biased closed but open and allow gravity flow through the collar member to the pump inlet when a certain predetermined head pressure is created on the upstream side of the separator;

the separator assembly being positioned just upstream of the pump inlet whereby the liquid passing through the assembly has stood in a static column sufficiently long for the entrained air to separate before entering the pump inlet.

2. A separator assembly as set forth in claim 1 including a circumferential seal means around the collar member which provides a seal between the collar member and the well casing.

3. A separator assembly as set forth in claim 1 including a circumferential seal means around the collar member which provides a loose-fitting seal between the collar member and the well casing, and each check valve means includes a seat with the poppet seated therein and the spring contained in a sleeve cage which urges the poppet member against said seat with a relatively constant force.

4. A separator assembly as set forth in claim 1 wherein each check valve means includes a seat with the poppet member all of which is contained within a sleeve cage, the sleeve cage having longitudinal slots therein for passage of fluid which provides a variable orifice the further the poppet is moved off its seat.

5. A separator assembly as set forth in claim 1 wherein each check valve means includes a seat with the poppet member all of which is contained within a sleeve cage, each sleeve cage is positioned in a side-by-side relation.

6. A separator assembly as set forth in claim 1 including at least sixteen check valve means, each check valve means includes a seat with the poppet member, all of which is contained within a sleeve cage.

* * * * *